(12) United States Patent
Huelsman et al.

(10) Patent No.: US 7,587,380 B2
(45) Date of Patent: Sep. 8, 2009

(54) RULE PROCESSING METHOD, APPARATUS, AND COMPUTER-READABLE MEDIUM TO GENERATE VALID COMBINATIONS FOR SELECTION

(76) Inventors: David L. Huelsman, 211 Cantwell Ct., Reynoldsburg, OH (US) 43068; Sharon E. Love, 1204 W. 32TH St., Austin, TX (US) 78756; Douglas M. Mair, 554 Timberlake Dr., Westerville, OH (US) 43081

( * ) Notice: Subject to any disclaimer, the term of this patent is extended or adjusted under 35 U.S.C. 154(b) by 300 days.

(21) Appl. No.: 10/950,809

(22) Filed: Sep. 28, 2004

(65) Prior Publication Data

US 2005/0080648 A1    Apr. 14, 2005

Related U.S. Application Data

(60) Provisional application No. 60/506,156, filed on Sep. 29, 2003.

(51) Int. Cl.
*G06N 5/02* (2006.01)
(52) U.S. Cl. ....................................................... 706/47
(58) Field of Classification Search ................... 706/47
See application file for complete search history.

(56) References Cited

U.S. PATENT DOCUMENTS

| | | | |
|---|---|---|---|
| 5,212,771 A | 5/1993 | Gane et al. |
| 5,301,284 A | 4/1994 | Estes et al. |
| 5,311,424 A | 5/1994 | Mukherjee et al. |
| 5,576,965 A | 11/1996 | Akasaka et al. |
| 5,630,025 A | 5/1997 | Dolby et al. |
| 5,701,400 A | 12/1997 | Amado |
| 5,745,765 A | 4/1998 | Paseman |
| 5,805,462 A | 9/1998 | Poirot et al. |

(Continued)

FOREIGN PATENT DOCUMENTS

WO    9948031    9/1999

OTHER PUBLICATIONS

F. Aloul, M. Mneimneh, and K. Sakallah "ZBDD-Based Backtrack Search SAT Solver" International Workshop on Logic Synthesis (IWLS), New Orleans, Louisiana, pp. 131-136, 2002. url = http://www.eecs.umich.edu/~faloul/.*

(Continued)

*Primary Examiner*—David R Vincent
*Assistant Examiner*—Lut Wong
(74) *Attorney, Agent, or Firm*—Stolowitz Ford Cowger LLP (57) ABSTRACT

A method of providing, in response to user-selected ones of attributes and/or enumerations thereof, a list of product choices from products whose compatibility is characterized by a ZDD rule model having one or more Include and Exclude ZDDs. The method comprises creating a ZDD sub-tree by scanning the Include ZDDs and keeping paths having the selected enumerations set, determining complete paths through the sub-tree to produce potentially valid combinations, checking the potentially valid combinations against the Exclude ZDDs to exclude invalid combinations, and providing resulting valid combinations. The scanning optionally includes examining nodes of the Include ZDDs or of the sub-tree against Index values of the selected enumerations to create nodes in the sub-tree. Other aspects include an apparatus implementing the method, and a computer-readable medium including program instructions enabling a processing device to perform the method.

10 Claims, 2 Drawing Sheets

U.S. PATENT DOCUMENTS

| | | | |
|---|---|---|---|
| 5,809,212 | A | 9/1998 | Shasha |
| 5,844,554 | A | 12/1998 | Geller et al. |
| 5,877,966 | A | 3/1999 | Morris et al. |
| 5,910,898 | A | 6/1999 | Johannsen |
| 5,924,077 | A | 7/1999 | Beach et al. |
| 5,963,953 | A | 10/1999 | Cram et al. |
| 5,987,473 | A | 11/1999 | Jorgensen |
| 6,002,854 | A | 12/1999 | Lynch et al. |
| 6,016,394 | A | 1/2000 | Walker |
| 6,031,984 | A | 2/2000 | Walser |
| 6,035,305 | A | 3/2000 | Strevey et al. |
| 6,064,982 | A | 5/2000 | Puri |
| 6,076,080 | A | 6/2000 | Morscheck et al. |
| 6,163,876 | A | 12/2000 | Ashar |
| 6,182,275 | B1 | 1/2001 | Beelitz et al. |
| 6,256,618 | B1 | 7/2001 | Spooner et al. |
| 6,321,186 | B1 | 11/2001 | Yuan et al. |
| 6,327,581 | B1 | 12/2001 | Platt |
| 6,349,290 | B1 | 2/2002 | Horowitz |
| 6,385,617 | B1 | 5/2002 | Malik |
| 6,389,576 | B1 | 5/2002 | Lam et al. |
| 6,396,488 | B1 | 5/2002 | Simmons et al. |
| 6,424,962 | B1 | 7/2002 | Billon |
| 6,442,732 | B1 | 8/2002 | Abramovici et al. |
| 6,519,767 | B1 | 2/2003 | Carter et al. |
| 6,529,890 | B1 | 3/2003 | Pandit et al. |
| 6,535,883 | B1 | 3/2003 | Lee et al. |
| 6,556,978 | B1 | 4/2003 | Ginsberg et al. |
| 6,567,814 | B1 | 5/2003 | Bankier |
| 6,598,035 | B2 | 7/2003 | Branson et al. |
| 6,651,096 | B1 | 11/2003 | Gai et al. |
| 6,658,458 | B1 | 12/2003 | Gai et al. |
| 6,741,975 | B1 | 5/2004 | Nakisa et al. |
| 6,795,832 | B2 | 9/2004 | McGeorge et al. |
| 6,874,016 | B1 | 3/2005 | Gai et al. |
| 6,952,812 | B2 | 10/2005 | Abadir et al. |
| 6,961,913 | B1 | 11/2005 | Okazaki et al. |
| 6,983,187 | B2 | 1/2006 | Kern |
| 7,130,783 | B1 | 10/2006 | Harer et al. |
| 7,188,333 | B1 | 3/2007 | LaMotta et al. |
| 2001/0029499 | A1 | 10/2001 | Tuatini et al. |
| 2002/0065701 | A1 | 5/2002 | Kim et al. |
| 2002/0078431 | A1 | 6/2002 | Reps |
| 2002/0095645 | A1 | 7/2002 | Rodeh |
| 2002/0108093 | A1 | 8/2002 | Moondanos et al. |
| 2002/0112213 | A1 | 8/2002 | Abadir et al. |
| 2002/0165701 | A1* | 11/2002 | Lichtenberg et al. ........... 703/7 |
| 2002/0178432 | A1 | 11/2002 | Kim et al. |

OTHER PUBLICATIONS

Alan Mischenko ("An Introduction to Zero-Suppressed Binary Decision Diagrams" 2001.*
S. Minato: "Zero-Suppressed BDDs and Their Applications", International Journal on Software Tools for Technology Transfer, vol. 3, No. 2, pp. 156-170, Springer, May 2001.
Mishchenko, Alan. "An Introduction to Zero-Suppressed Binary Decision Diagrams" 2001, Jun. 8, Department of Electrical Engineering Portland State University. pp. 1-15.
J Moller, HR Andersen, H Hulgaard, "Product Configuration over the Internet presented at", The 6th Informs Conference on Information Systems and Technology, Nov. 3-4, 2001, Miami Beach, Florida.
"Array". Microsoft Computer Dictionary, Fifth Edition. May 1, 2002.
Jesper Moller "Configuration and E-commerce", IFORS Jul. 2002.
Cabodi, et al., Symbolic Traversals of Data Paths with Auxilary Variables, IEEE, 1994, pp. 93-96.
Panda, et al., Symmetry Detection and Dynamic Variable Ordering of Decision Diagrams, Proceedings of the 1994 IEEE/ACM International Conference on Computer-Aided Design, Nov. 1994, pp. 628-631.
Cosnard, et al., Automatic Task Graph Generation Techniques, Proceedings of the Twenty-Eighth Hawaii International Conference on System Sciences, Vo. 2, Jan. 3, 1995, pp. 113-122.
Bryant, Binary Decision Diagrams and Beyond, Enabling Technologies for Formal Verification, IEEE, 1995, pp. 236-243.
Minato, S., Representations of Discrete Funtions, Chapter 1, Graph-Based Representations of Discrete Functions, Sasao and Fujia, ed.s, 1996, Kluwer Academic Publishing, pp. 1-23.
Anderson, An Introduction to Binary Decision Diagrams, University of Denmark, Oct. 1997, pp. 8-11.
Cugola, G, et al., Exploiting an event-based infrastructure to develop complex distributed systems, Proceedings of the 20th International Conference on Software Engineering, Apr. 1998, pp. 261-270.
Gottlob, et al., The complexity of acyclic conjunctive queries, 39th Annual Symposium on Foundations of Computer Science Proceedings, Nov. 8, 1998, pp. 706-715.
Yang, Optimizing Model Checking Based on BDD Characterizaiton, Thesis, Carnegie Mellon U.,May 1999, pp. 9-11.
Ejnioui, et al., Design Partitioning on Single-chip Emulations Systems, Thirteenth International Conference on VLSI Design, Jan. 3, 2000, pp. 234-239.
Kurihara, et al., BDD Encoding for Partial Order Constraints and its Application to Expert Systems in Software Verification Domains, 2000 IEEE International Conference on Systems, Man, Cybernetics, vol. 3, Oct. 8-11, 2000, pp. 2062-2067.
Beck, M., et al., Enabling Full Service Surrogates Using the Portable Channel Representation, Proceedings of the Tenth International Conference on World Wide Web, Apr. 2001, pp. 376-385.
USPTO; File History U.S. Appl. No. 10/950,622 to Huelsman et al., filed Sep. 28, 2004; Part 1, Sep. 2004 through Mar. 2007.
USPTO; File History U.S. Appl. No. 10/950,622 to Huelsman et al., filed Sep. 28, 2004; Part 2, Sep. 2007 through Dec. 2007.
USPTO; File History U.S. Appl. No. 10/950,622 to Huelsman et al., filed Sep. 28, 2004; Part 3,Apr. 2008 through May 2008.
USPTO; File History U.S. Appl. No. 10/950,622 to Huelsman et al., filed Sep. 28, 2004; Part 4, May 2008 through Aug. 2008.
USPTO; File History U.S. Appl. No. 10/950,815 to Huelsman et al., filed Sep. 28, 2004; Part 1, Sep. 2004 through Feb. 2007.
USPTO; File History U.S. Appl. No. 10/950,815 to Huelsman et al., filed Sep. 28, 2004; Part 1, May 2007 through Feb. 2009.
Minato, S., "Zero-Suppressed BDDs and Their Applications", International Journal on Software Tools for Technology Transfer, vol. 3, No. 2, pp. 156-170, Springer, May 2001.
Minato, Zero-Suppressed BDDs for Set Manipulation in Combinatorial Problems, Proceedings of the 30th Conference on Design Automation, Jul. 1993, pp. 272-277.
USPTO; File History U.S. Appl. No. 10/950,622 to Huelsman et al., filed Sep. 28, 2004; Part 5, Aug. 2008 through Dec. 2008.

* cited by examiner

Fig. 1

| Specifications | | HP (Hewlett-Packard) | Samsung | BenQ | Samsung | Planar | Sceptre | Dell | ViewSonic | HP (Hewlett-Packard) |
|---|---|---|---|---|---|---|---|---|---|---|
| Manufacturer: Any | | Remove Check Prices | Remove Check Prices | Remove Check Prices | Remove Check Prices | Remove Check Prices | Remove Check Prices | Remove Check Prices | Remove Check Prices | Remove Check Prices |
| Viewable Size: 19 Inches | | Pavilion F1903 19" LCD Monitor (19", 1280x1024, .294mm, DVI, PC/Mac) | SyncMaster 191T+ Black 19" LCD Monitor (19", 1280x1024, .294mm, PC/Mac) | FP951 19" LCD Monitor (19", 1280x1024, .294mm, DVI, PC) | SyncMaster 193P Silver 19" LCD Monitor (19", 1280x1024, .294mm, DVI, PC/Mac) | PE191M-BK 19" LCD Monitor (19", 1280x1024, .294mm, DVI, PC) | X9sNaqaII Silver 19" LCD Monitor (19", 1280x1024, .264mm, DVI, PC) | E151FP 15" LCD Monitor (15", 1024x768, .297mm, PC/Mac) | VP201b Black 20.1" LCD Monitor (20.1", 1600x1200, DVI, PC/Mac) | L2335 Silver 23" LCD Monitor (23", 1920x1200, .258mm, DVI & S-Video, PC) |
| Interface Type: Any | | $489.00 | $624.00 | $528.79 | $721.83 | $539.00 | $479.00 | $249.95 | $850.00 | $1474.00 |
| Resolution: 1024 x 768 | | ★★★★☆ (4.00 / 5.00) | ★★★★★ (5.00 / 5.00) | ★★★★★ (5.00 / 5.00) | ★★★★★ (5.00 / 5.00) | ★★★★☆ (4.00 / 5.00) | Not Rated | Not Rated | ★★★★☆ (4.33 / 5.00) | ★★★★★ (5.00 / 5.00) |
| Contrast Ratio: Any | | (Read 1 Review) | (Read 2 Reviews) | (Read 6 Reviews) | (Read 4 Reviews) | (Read 1 Review) | (None) | (None) | (Read 3 Reviews) | (Read 1 Review) |
| System Type: PC | | $50 Rebate! | (None) | (None) | $50 Rebate Merchant Restricted! | (None) | (None) | (None) | (None) | (None) |

Fig.2

RULE PROCESSING METHOD, APPARATUS, AND COMPUTER-READABLE MEDIUM TO GENERATE VALID COMBINATIONS FOR SELECTION

CROSS-REFERENCE TO RELATED PATENTS AND PATENT APPLICATIONS

This invention claims the benefit of Provisional Application Ser. No. 60/506,156 filed on Sep. 29, 2003 in the names of Huelsman, et al., entitled Improved Method and Apparatus for Rule Processing, which is incorporated herein by reference.

This invention is also related to U.S. patent application Ser. Nos. 10/101,151 and 10/101,154, each filed on Mar. 20, 2002 in the names of the same inventors hereof, which are incorporated herein by reference.

BACKGROUND

This invention concerns an improvement to a method or apparatus for rule processing preferably utilizing zero-suppressed binary decision diagrams (ZDDs) to express and manipulate a business rule, but more specifically, to a method or an apparatus to generate valid combinations of features or components of a product or service for selection by a user based on an arbitrary set of input specifications.

Specialized rule processing or artificial intelligence (AI) applications are often employed to produce valid combinations of compatible product components, features, or operational characteristics. These applications typically display a table of alternatives product selections on a computer monitor given an arbitrary set of search criteria supplied by an end user, such as a customer engaged in on-line shopping. It becomes a challenge to generate compatible product or service configurations when subparts or components of the product or service become numerous thereby exponentially multiplying the number of possible valid or invalid combinations.

For customer service applications, it is also desirable to provide search results instantaneously, e.g., within a couple of seconds or less. For many complex products, such a constraint is difficult to meet with prior systems.

Figure 1:
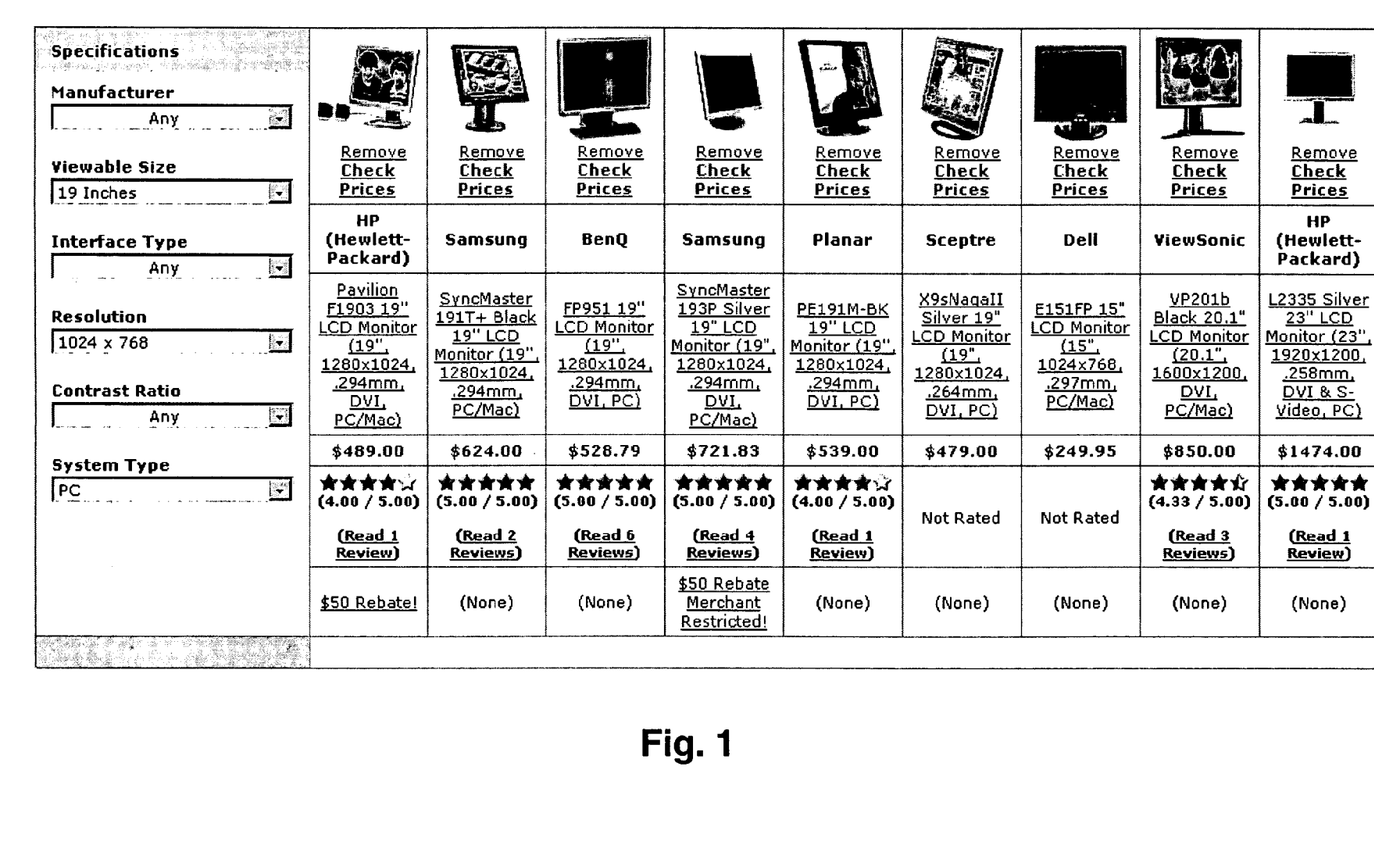
FIG. 1 is GUI display illustrating user-selections of attributes and enumerations, e.g., product specifications, and a resulting list of product choices responsive to the user-selected attributes and enumerations.

A rule processing system described in the above-mentioned, incorporated U.S. patent application Ser. Nos. 10/101,151 and 10/101,154 utilizes a form a binary decision diagrams (or directed acylic graphs) to provide a user with conflict and selection advice based on a given set of input parameters, therein called attributes and enumerations thereof. To extend the utility of that invention, the present invention also utilizes a form of binary decision diagrams (or directed acylic graph), preferably zero-suppressed binary decision diagrams, to provide an end user or customer with a number of valid choices of product or service configurations based on a given arbitrary set of input parameters, e.g., product specifications. FIG. 1 shows an example of graphic shown on a user interface when a customer seeks to purchase a computer monitor. In the example, the customer may specify attributes, such as a manufacturer, viewable size, interface type, resolution, contrast ratio, or system type. Based on these search criteria, the rule processing system may display all available computer monitors meeting the criteria along with a listing of enumerations, such as product features, characteristics, price, rebates, or other data about each selected product attribute.

The present invention takes advantage of the rule processing procedures of the prior related inventions to provide a user with valid selections of a product or service based on a set of specified inputs or search criteria.

SUMMARY

The present describes an embodiment of a method of providing a list of product choices from products having specifications whose compatibility is characterized by a Zero-suppressed binary Decision Diagram (ZDD) rule model including one or more Include rules and one or more Exclude rules. The method comprises selecting, from a list of attributes and enumerations of the products, one or more of the enumerations, creating a ZDD sub-tree by scanning the one or more Include rules and keeping paths having the selected one or more of the enumerations asserted, and determining complete paths through the ZDD sub-tree terminating at a "one" node to produce potentially valid combinations. The method further comprises excluding some of the potentially valid combinations by applying the one or more Exclude rules to the potentially valid combinations, determining valid combinations responsive to the excluding the some of the potentially valid combinations, and providing the valid combinations as the list of product choices for access by a user.

The present further describes an embodiment of an apparatus to provide a list of product choices from products whose compatibility is characterized by a Zero-suppressed binary Decision Diagram (ZDD) rule model having one or more Include rules and one or more Exclude rules. The apparatus comprises an input device, a processor, and an output device. The input device selects, from a list of attributes or enumerations of the products, a particular one or more of the enumerations. The processor includes a ZDD sub-tree creating circuit to create a ZDD sub-tree by scanning the Include rules and keeping paths including the selected particular one or more of the enumerations, a determining circuit to determine complete paths through the ZDD sub-tree terminating at a "one" node to produce potentially valid combinations, and a check circuit to check the potentially valid combinations against the Exclude rules to find valid ones of the potentially valid combinations. The output device outputs the valid ones of the potentially valid combinations as the list of product choices for access by a user.

The present further describes a computer-readable medium having a set of instructions stored thereon which, when executed by a processing device, causes the processing device to perform procedures to provide a list of product choices from products having specifications whose compatibility is characterized by a Zero-suppressed binary Decision Diagram (ZDD) rule model including one or more Include rules and one or more Exclude rules, the procedures includes selecting, from a list of attributes and enumerations of the products, one or more of the enumerations, creating a ZDD sub-tree by scanning the Include rules and keeping paths having the selected one or more of the enumerations set, determining complete paths through the ZDD sub-tree terminating at a "one" node to produce potentially valid combinations checking the potentially valid combinations against the Exclude rules to determine valid ones of the potentially valid combinations by excluding ones of the potentially valid combinations that are excluded under the Exclude rules, and providing the valid ones of the potentially valid combinations as the list of product choices for access by a user.

Other aspects and features of the invention will become apparent upon review of the following description. The invention, though, is pointed out with particularity by the appended claims.

DESCRIPTION OF ILLUSTRATIVE EMBODIMENT

Figure 2:
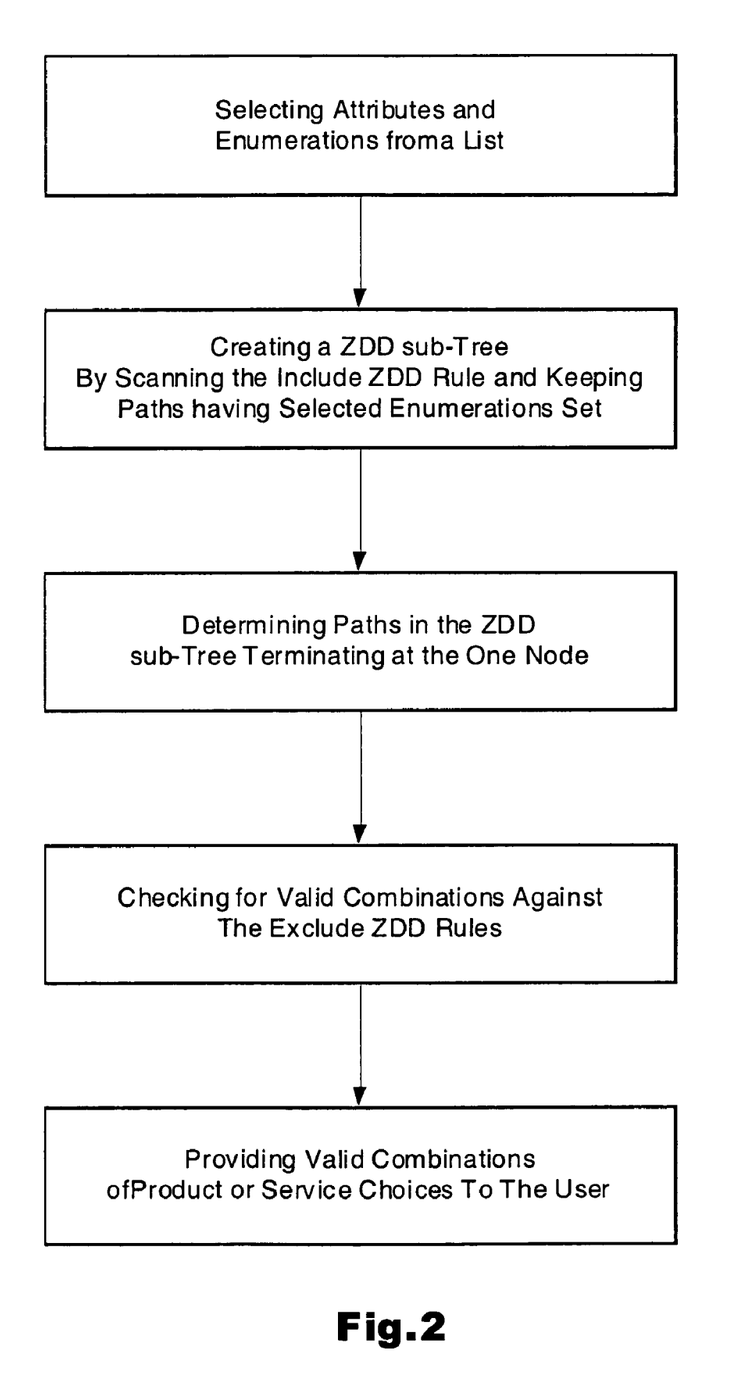
FIG. 2 is a flow diagram of an illustrative procedure according to an aspect of the present invention.

The present invention makes use of zero-suppressed binary decision diagrams (ZDDs), which are referenced above in the Cross-References To Related Patents and Patent Applications. A ZDD is made up of an Index that maps directly to enumerations (e.g., product features), a "Then" leg that points to a ZDD node, and an "Else" leg that points to another ZDD node. To obtain a list of choices according to the herein described illustrative embodiment as shown in FIG. 2, a user typically uses a keyboard and pointing device of a computer to provide a given a set of selections on various input product attributes and enumerations. In response, the method and apparatus of the present invention acts on the user-selected inputs to output another set of output attributes with valid combinations of input selections. The output is preferably displayed on a computer monitor, or supplied to an I/O device for printing or other output.

Include Processing:

To generate valid choices or combinations, the method or computer implementation thereof scans through an Include ZDD of a packaged ZDD rule model and keeps all paths in the Include ZDD that have enumerations set (e.g., asserted or selected). For every node traversed during the scan, one of the following steps occurs with respect to a node in the include ZDD:

If the index encountered matches one of the input enumerations selected by a user, a node is created in a new ZDD tree that includes this index and the subgraphs pointed to by the Then and Else legs of the node.

If the index is in the set of output enumerations, a new node is created, as above.

If a Constant node is encountered, the constant is returned.

Otherwise, the subgraphs pointed to on the Else leg of the node is returned.

The above rules describe a recursive procedure to create the ZDD. The resulting ZDD is a sub-tree of the original Include ZDD of the rule model characterizing the product or service in question, and is used to produce valid combinations or choices based on user-selected input criteria. The preferred method or apparatus then adds in nodes for all of the enumerations that are always valid. This modified ZDD is then stored as a SelectionCombos object described in the appendix, which is returned to the user or calling routine.

Traversing the SelectionCombos Tree Object:

Valid combinations are read from the SelectionCombos object using a GetFirstCombo routine, also described in the appendix, to move to the first valid combination. A first combination by finding a complete path through the ZDD that ends on the "one" node. Then the GetNextCombo routine is invoked to get the next valid combination. GetNextCombo walks the next path in the ZDD. It's important to note that the order of the combinations is the same as the index order from the Include ZDD.

Exclude Processing:

As each possible combination or choice is produced, it is checked against the Exclude ZDD of a packaged rule model characterizing the product or service. If the resulting combination is excluded, then another combination is produced. When a combination is found that isn't excluded, it is returned to the calling routine or end user by way of a display or other output as a valid choice or combination. Thus, combinations are excluded in real-time. Because combinations are excluded in real-time, one cannot obtain an accurate count of valid combinations until completion. One can, however, obtain an upper limit of the number of valid combinations by counting all paths in the resulting include ZDD.

Bookmarks:

As the SelectionCombos object is traversed, locations can be bookmarked. This allows the user to jump back to the bookmark and start getting combinations from that location. A MakeBookmark routine writes a new bookmark in memory for later recall. It creates a collection of the enumeration indexes on a current path and adds this collection to the end of an array in the SelectionCombos object. The routine returns the index of the new array entry. A GotoBookmark requires an integer. This routine will move to an existing bookmark in the array of bookmarks.

Preferable, the bookmarks are not ordered or sorted. They stay in the order that they are created. For example, if the following sequence of operations is performed:

GetFirstCombo,
GetNextCombo, GetNextCombo, GetNextCombo,
MakeBookMark,
GetNextCombo, GetNextCombo, GetNextCombo, GetNextCombo,
MakeBookMark,
GotoBookMark(0),
GetNextCombo, GetNextCombo,
MakeBookMark The bookmarks will appear, as follows:

| Bookmark Index | 0 | 1 | 2 |
|---|---|---|---|
| Combination # | 2 | 6 | 4 |

The bookmarks preferably remain for the entire life of the SelectionCombos object.

Based on the above teachings, the invention also embraces modifications not explicitly shown in the drawings or written description. In particular, the invention is preferably practiced utilizing zero-suppressed binary decision diagrams (ZDDs) but software emulations or other representations of ZDDs may be employed to achieve substantially the same results. Typically, a keyboard and pointing device (e.g., a mouse) is used to supply inputs to a GUI (graphical user interface). The GUI also is used to provide results to the user. A processor (desktop, handheld, or other portable computing device) typically implements the method. Access and transfer of data may occur locally or via a network, e.g. the Internet or a LAN. Also, the illustration was directed to a product configuration business rule, but may be extended to other scenarios to the same extent described in the incorporated and related patents and patent applications. Accordingly, the disclosure is not intended to limit the scope of the invention set forth by the appended claims.

APPENDIX

Notations Used

The notation used for attributes in this document is "Attr" followed by a number. The first attribute in the examples is Attr1.

The notation for enumerations is "Enum" followed by two numbers. The first number is the attribute that it belongs to. The second number is its number within the attribute from 1 to 5.

The ellipses symbol " . . . " is used to show a range of enumerations.

For convenience and illustration, every attribute in the examples shown herein has five (5) enumerations.

The word "related" means that the attributes are in the same rule. The double arrow symbol "↔" also means that the attributes are related.

GetCombosForSelections Algorithm

Description: Given a set of selections (enumerations and attributes), returns all combinations of a second set of attributes.

Exemplary Code

This routine is only accessible through an API interface. The entry points are:
 CombosForSelections to create the object
 GetNextCombo to display the next combo
 GetComboCount to determine the total number of combos.

```
/*******************************************************************
\
    Proc: CombosForSelections(zdd, selections, inputGroups, outputGroups)
\*******************************************************************
/
SelectionCombos    *CombosForSelections(HBdd hBddI, HBdd hBddX, IntArray &aSelections,
                            IntArray &aInputGroups, IntArray &aOutputGroups, IntArray &aCombo)
{
    int            nGroups;
    BddErrorCode   retVal = ecSuccess;
    Dm_Manager     *ddI, *ddX;
    Dm_Node        *pZddI, *pZddX;
    GroupItem      *pGroupInfo;
    HManager       hManagerI = g_BddTableArray[hBddI].hManager;
    SelectionCombos *sc = NULL;
    if (ecSuccess == (retVal = GetBddFromHandle(hBddI, &pZddI, &ddI)))
    {
        if (ecSuccess == (retVal = GetBddFromHandle(hBddX, &pZddX, &ddX)))
        {
            pGroupInfo = g_ManagerTableArray[hManagerI].groups;
            nGroups = g_ManagerTableArray[hManagerI].nGroups;
            sc = CombosForSelectionsC(ddI, ddX, pZddI, pZddX, aSelections,
                               aInputGroups, aOutputGroups, aCombo, nGroups, pGroupInfo);
        }
    }
    return sc;
}
SelectionCombos    *CombosForSelectionsC(Dm_Manager *ddI, Dm_Manager *ddX,
                            Dm_Node *pZddI, Dm_Node *pZddX, IntArray &aSelections,
                            IntArray &aInputGroups, IntArray &aOutputGroups,
                            IntArray &aCombo, int nGroups, GroupItem *pGroupInfo)
{
    SelectionCombos *sc = new SelectionCombos( );
    sc->setGroupInfo(nGroups, pGroupInfo);
    sc->setIncludePac(ddI, pZddI);
    sc->setExcludePac(ddX, pZddX);
    sc->setInputs(aSelections, aInputGroups, aOutputGroups);
    sc->generateCombos( );
    sc->getFirstCombo(aCombo);
    sc->getNextCombo(aCombo);
    return sc;
}
/*******************************************************************
\
    Proc: GetNextCombo(tree, currentCombo)
\*******************************************************************
/
void GetNextCombo(SelectionCombos &sc, IntArray &aCombo)
{
    sc.getNextCombo(aCombo);
}
/*******************************************************************
\
    Proc: GetComboCount(tree)
\*******************************************************************
/
int GetComboCount(SelectionCombos &sc)
{
    return sc.getCount( );
}
```

From the SelectionCombos.H File

```
#if !defined(___SELECTIONCOMBOS_H___)
#define ___SELECTIONCOMBOS_H___
#pragma warning(push)
#include <yvals.h>
#pragma warning(disable : 4512)
#include <map>
#pragma warning(pop)
#pragma warning(disable : 4786)
#define UNDEFINED -1
typedef std::map<Dm_Node*, Dm_Node*> MapNode;
typedef std::map<int, NodeArray> MapCache;
enum UsageType {UTDontCare, UTNotUsed, UTSelected};
enum SourceType {STNone=0, STInclude=1, STExclude=2, STBoth=3};
/*********************************************************************
\
    Class: SelecionCombos
    Description:
        This routine will return a tree that contains the advice for the input set of
        selections.
        Keep in mind:
            The inputs can be multi-select.
            We need to look through pending attributes.
        Issues:
            What if the attributes of the input set are not all related. This shouldn't
            be a problem at all. Relationships should not be an issue in this algorithm.
            Do we need to create a smaller exclude tree also? Yes, or we can NAND out
            all of the excluded items.
            We need to get the group information down to this class.
\*********************************************************************
/
class SelectionCombos
{
    bool        m_bHasExcludedEnums;
    int         m_nNCCount,
                m_nNumGroups,
                m_nNumBookmarks;
    Dm_Manager  *m_ddI,
                *m_ddX;
    Dm_Node     *m_pZddI,
                *m_pCurI,
                *m_pZddX,
                *m_pCurX;
    GroupItem   *m_pGroupInfo;
    IntArray    m_aSelections,
                m_aInputGroups,
                m_aOutputGroups,
                m_aEnumUsage,
                m_aEnumSource,
                m_aGroupSource,
                m_aEnum2Group;
    MapNode     m_GenCache;
    NodeArray   m_aNodeCache;
    MapCache    m_Bookmarks;
private:
    bool isComboExcluded(IntArray &aCombo);
    void buildEnumSource(Dm_Node *pCur, int nCurSource);
    void buildEnumUsage( );
    void clear( );
    Dm_Node *removeIndexes(Dm_Manager *dd, Dm_Node *pZdd);
    Dm_Node *addAlwaysPaths(Dm_Node *pInZdd);
    Dm_Node *removeExcludedPaths(Dm_Node *pI, Dm_Node *pX);
public:
    /*********************************************************************
    **\
        Proc: SelectionCombos – Constructor
    \*********************************************************************
    **/
    SelectionCombos( )
    {
        m_nNumBookmarks = UNDEFINED;
    }
    /*********************************************************************
    **\
        Proc: ~SelectionCombos – Destructor
    \*********************************************************************
```

-continued

```
**/
    virtual ~SelectionCombos( )
    {
      clear( );
    }
    void    generateCombos( );
    int     getCount( );
    bool    getFirstCombo(IntArray &aCombo);
    bool    getNextCombo(IntArray &aCombo);
    void    setGroupInfo(int nNumGroups, GroupItem *pGroupInfo);
    void    setIncludePac(Dm__Manager *ddI, Dm__Node * pZddI);
    void    setExcludePac(Dm__Manager *ddX, Dm__Node * pZddX);
    void    setInputs(IntArray &aSelections, IntArray &aInputGroups, IntArray
&aOutputGroups);
    int     makeBookmark( );
    void    gotoBookmark(int nBookmark, IntArray &aCombo);
};
#endif/* ___SELECTIONCOMBOS_H___ */
```

The invention claimed is:

1. A computer-implemented method, comprising:

characterizing compatibility between one or more enumerations of one or more products using a Zero-suppressed binary Decision Diagram (ZDD) rule model including one or more Include rules and one or more Exclude rules;

receiving one or more enumerations of a product selected by a user using a graphical interface;

recursively creating a ZDD sub-tree by scanning the one or more Include rules and, for nodes traversed during the scanning, one or more of:

if an index matches one of the one or more enumerations of the product selected by the user or if the index matches one or more valid combinations of one or more enumerations of the product provided to the user, creating a new node in a ZDD sub-tree that includes the index and one or more graphs pointed to by the Then and Else legs of the node;

if a Constant node is encountered, returning the constant; or returning one or more graphs pointed to by the Else leg of the node;

determining complete paths through the ZDD sub-tree terminating at a One node to produce potentially valid combinations;

excluding some of the potentially valid combinations by applying the one or more Exclude rules to the potentially valid combinations as each of the potentially valid combinations is produced;

determining the one or more valid combinations of one or more enumerations of the product responsive to the excluding the some of the potentially valid combinations; and providing the one or more valid combinations as the list of product choices to the user.

2. The computer-implemented method of claim 1, where the providing includes displaying at least some of the list of product choices on a display monitor.

3. The computer-implemented method of claim 1, where each of the potentially valid combinations includes ones of the nodes of the ZDD sub-tree on a respective one of the complete paths.

4. The method of claim 1 where determining complete paths through the ZDD sub-tree includes bookmarking potentially valid combinations by creating a collection of indexes on the complete paths of the ZDD sub-tree.

5. A system to provide a list of product choices from products whose compatibility is characterized by a Zero-suppressed binary Decision Diagram (ZDD) rule model having one or more Include rules and one or more Exclude rules, the apparatus comprising:

an input device to aid a user in selecting, from a list of attributes or enumerations of the products, a particular one or more of the enumerations;

a processor to execute instructions that enable the processor to:

recursively create a ZDD sub-tree by scanning the Include rules and keeping paths including the selected particular one or more of the enumerations and, for nodes of the Include rules traversed during the scanning, one or more of:

if an index matches the selected particular one or more of the enumerations or if the index matches one or more valid ones of potentially valid combinations of a list of product choices provided to the user, creating a new node in a ZDD sub-tree that includes the index and one or more graphs pointed to by the Then and Else legs of the node;

if a Constant node is encountered, returning the constant; or returning one or more graphs pointed to by the Else leg of the node;

determine complete paths through the ZDD sub-tree terminating at a One node to produce potentially valid combinations; and check the potentially valid combinations against the Exclude rules to find valid ones of the potentially valid combinations as each of the potentially valid combinations is produced; and an output device enabled to output the valid ones of the potentially valid combinations as the list of product choices to the user.

6. The system of claim 5, where the input device comprises at least one of a keyboard and a pointing device; and where the output device comprises one of a display monitor and a printer.

7. The system of claim 5, where the processor includes an identification circuit to identify each of the potentially valid combinations as ones of the nodes of the ZDD sub-tree on a respective one of the complete paths.

8. A computer-readable medium having a set of instructions stored therein which, when executed by a processing device, causes the processing device to perform procedures comprising:

characterizing compatibility between one or more enumerations of one or more products using a Zero-suppressed binary Decision Diagram (ZDD) rule model including one or more Include rules and one or more Exclude rules;

receiving one or more enumerations selected by a user using a graphical interface;

recursively creating a ZDD sub-tree by scanning the Include rules and, for nodes traversed during the scanning, one or more of:

if an index matches one of the one or more enumerations of the product selected by the user or if the index matches one or more valid ones of potentially valid combinations of product choices provided to the user, creating a new node in a ZDD sub-tree that includes the index and one or more graphs pointed to by the Then and Else legs of the node;

if a Constant node is encountered, returning the constant; or         returning one or more graphs pointed to by the Else leg of the node;

determining complete paths through the ZDD sub-tree terminating at a One node to produce potentially valid combinations;

checking the potentially valid combinations against the Exclude rules to determine valid ones of the potentially valid combinations by excluding ones of the potentially valid combinations that are excluded under the Exclude rules as each of the potentially valid combinations is produced; and     providing the valid ones of the potentially valid combinations as the product choices to the user.

9. The computer-readable medium of claim 8, where the providing includes displaying at least some of the product choices on a display monitor.

10. The computer-readable medium of claim 8, where each of the potentially valid combinations includes ones of the nodes of the ZDD sub-tree on a respective one of the complete paths.

* * * * *

UNITED STATES PATENT AND TRADEMARK OFFICE
CERTIFICATE OF CORRECTION

PATENT NO. : 7,587,380 B2  Page 1 of 1
APPLICATION NO. : 10/950809
DATED : September 8, 2009
INVENTOR(S) : Huelsman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 523 days.

Signed and Sealed this

Twenty-first Day of September, 2010

David J. Kappos
*Director of the United States Patent and Trademark Office*